United States Patent
Staton

(10) Patent No.: US 12,359,488 B1
(45) Date of Patent: Jul. 15, 2025

(54) VIBRATION DAMPING SYSTEM

(71) Applicant: Newtonoid Technologies, L.L.C., Liberty, MO (US)

(72) Inventor: Fielding B. Staton, Liberty, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 596 days.

(21) Appl. No.: 16/951,866

(22) Filed: Nov. 18, 2020

Related U.S. Application Data

(60) Provisional application No. 62/936,786, filed on Nov. 18, 2019.

(51) Int. Cl.
  *E05F 7/04* (2006.01)
  *F16F 7/10* (2006.01)

(52) U.S. Cl.
  CPC .............. *E05F 7/04* (2013.01); *F16F 7/1005* (2013.01); *E05Y 2800/422* (2013.01); *F16F 2230/08* (2013.01)

(58) Field of Classification Search
  CPC ........................................................ E05F 7/04
  See application file for complete search history.

(56) References Cited

U.S. PATENT DOCUMENTS

| | | | |
|---|---|---|---|
| 1,383,582 A | 7/1921 | Stubbs | |
| 1,383,592 A | 7/1921 | Anthes | |
| 1,470,952 A * | 10/1923 | Baruch | E05F 7/04 49/420 |
| 2,950,576 A | 8/1960 | David | |
| 2,961,692 A * | 11/1960 | Engesser | E05F 7/04 49/467 |
| 3,467,973 A | 9/1969 | Minnick | |
| 3,783,568 A | 1/1974 | Adler et al. | |
| 4,350,978 A | 9/1982 | Riccobono | |
| 4,690,960 A | 9/1987 | Yamauchi et al. | |
| 5,204,998 A | 4/1993 | Liu | |
| 5,348,363 A | 9/1994 | Fink | |
| 5,621,922 A | 4/1997 | Rush, III | |
| 5,902,656 A | 5/1999 | Hwang | |
| 5,946,866 A | 9/1999 | Weglewski et al. | |
| 5,956,777 A | 9/1999 | Popovich | |
| 6,378,140 B1 | 4/2002 | Abraham et al. | |
| 6,681,908 B2 * | 1/2004 | Davis | F16F 7/116 188/380 |
| 6,826,509 B2 | 11/2004 | Crisco, III et al. | |
| 7,241,017 B2 | 7/2007 | Ariyoshi | |
| 7,426,804 B2 | 9/2008 | Pylkki et al. | |
| 7,461,726 B2 | 12/2008 | Hawkins et al. | |
| 7,526,389 B2 | 4/2009 | Greenwald et al. | |

(Continued)

OTHER PUBLICATIONS

Final Office Action, dated Aug. 23, 2017, 18 pages, issued in U.S. Appl. No. 15/352,419.

(Continued)

*Primary Examiner* — Joshua K Ihezie
(74) *Attorney, Agent, or Firm* — AVEK IP, LLC

(57) ABSTRACT

A damping system includes a support structure having an attachment portion and a damping node mounting portion. A damping node is attached to the damping node mounting portion. The support structure is secured to an impact receiving surface via the attachment portion. The damping node is configured to mitigate an impact force received upon the impact receiving surface.

20 Claims, 5 Drawing Sheets

(56) References Cited

U.S. PATENT DOCUMENTS

| | | | |
|---|---|---|---|
| 8,303,027 | B2 | 11/2012 | Murakami et al. |
| 8,695,955 | B1 | 4/2014 | Staton |
| 8,789,818 | B1 | 7/2014 | Staton |
| 8,899,562 | B1 | 12/2014 | Staton |
| 8,938,818 | B2 | 1/2015 | Ide et al. |
| 9,341,527 | B2 | 5/2016 | O'Bier et al. |
| 9,476,478 | B2 * | 10/2016 | Staton ................... F16F 15/005 |
| 9,759,286 | B1 | 9/2017 | Staton et al. |
| 9,845,838 | B2 | 12/2017 | Staton |
| 9,951,835 | B2 | 4/2018 | Staton |
| 10,244,812 | B2 | 4/2019 | Staton |
| 10,251,440 | B1 | 4/2019 | Staton |
| 10,495,174 | B1 | 12/2019 | Staton |
| 10,561,190 | B2 | 2/2020 | Staton |
| 11,284,662 | B2 | 3/2022 | Staton |
| 11,560,931 | B2 | 1/2023 | Staton |
| 2001/0011487 | A1 | 8/2001 | Kojima et al. |
| 2001/0034990 | A1 | 11/2001 | Reichert |
| 2004/0012502 | A1 | 1/2004 | Rasmussen |
| 2004/0232240 | A1 | 11/2004 | O'Keeffe et al. |
| 2006/0032715 | A1 | 2/2006 | Barvosa-Carter et al. |
| 2006/0155036 | A1 | 7/2006 | Ackermans |
| 2008/0085405 | A1 | 4/2008 | Prenzel et al. |
| 2008/0163410 | A1 | 7/2008 | Udelhofen |
| 2010/0214634 | A1 | 8/2010 | Kroll et al. |
| 2011/0203653 | A1 | 8/2011 | Johnson et al. |
| 2012/0098941 | A1 | 4/2012 | Joseph et al. |
| 2012/0233745 | A1 | 9/2012 | Veazie |
| 2012/0261867 | A1 | 10/2012 | Gilkes |
| 2013/0061371 | A1 | 3/2013 | Phipps et al. |
| 2013/0125296 | A1 | 5/2013 | Rabinovitch |
| 2013/0185837 | A1 | 7/2013 | Phipps et al. |
| 2014/0247129 | A1 | 9/2014 | Fuente |
| 2015/0245681 | A1 | 9/2015 | Knight |
| 2021/0003192 | A1 * | 1/2021 | Mosten ................. F16F 15/035 |
| 2023/0151869 | A1 | 5/2023 | Staton |

OTHER PUBLICATIONS

Final Office Action, dated Feb. 1, 2018, 16 pages, issued in U.S. Appl. No. 15/594,200.

Final Office Action, dated Mar. 19, 2018, 15 pages, issued in U.S. Appl. No. 15/274,837.

Non-Final Office Action, dated Apr. 25, 2017, 15 pages, issued in U.S. Appl. No. 15/352,419.

Non-Final Office Action, dated Aug. 28, 2018, 10 pages, issued in U.S. Appl. No. 15/274,837.

Non-Final Office Action, dated Jul. 17, 2018, 13 pages, issued in U.S. Appl. No. 15/594,200.

Non-Final Office Action, dated Jul. 23, 2019, 18 pages, issued in U.S. Appl. No. 16/285,569.

Non-Final Office Action, dated Sep. 15, 2021, 12 pages, issued in U.S. Appl. No. 16/702,159.

Non-Final Office Action, dated Sep. 17, 2019, 32 pages, issued in U.S. Appl. No. 15/845,840.

Non-Final Office Action, dated Sep. 29, 2017, 23 pages, issued in U.S. Appl. No. 15/594,200.

Notice of Allowance, dated Feb. 13, 2019, 12 pages, issued in U.S. Appl. No. 15/274,837.

Notice of Allowance, dated Nov. 19, 2021, issued in U.S. Appl. No. 16/373,570.

Notice of Allowance, dated Nov. 23, 2018, 12 pages, issued in U.S. Appl. No. 15/594,200.

Notice of Allowance, dated Oct. 21, 2019, 9 pages, issued in U.S. Appl. No. 15/845,840.

Notice of Allowance, dated Oct. 26, 2017, 9 pages, issued in U.S. Appl. No. 15/352,419.

Notice of Allowance, dated Oct. 30, 2019, 8 pages, issued in U.S. Appl. No. 16/285,569.

* cited by examiner

VIBRATION DAMPING SYSTEM

CROSS-REFERENCE TO RELATED APPLICATIONS

This application claims the benefit of priority of U.S. Provisional Patent Application No. 62/936,786, filed Nov. 18, 2019, the disclosure of which is incorporated by reference herein in its entirety.

FIELD OF THE DISCLOSURE

The disclosure relates generally to the field of damping devices. Specifically, the disclosure relates to a damping device that is securable to a surface for reducing or mitigation vibrations on the surface due to impact forces received upon the surface.

SUMMARY OF THE INVENTION

The following presents a simplified summary of the invention in order to provide a basic understanding of some aspects thereof. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, a damping system includes a support structure having an attachment portion and a damping node mounting portion. A damping node is attached to the damping node mounting portion. The support structure is secured to an impact receiving surface via the attachment portion. The damping node is configured to mitigate an impact force received upon the impact receiving surface.

According to another embodiment, a method for damping impact forces, includes providing a damping device having a support structure comprising an attachment portion, a damping node mounting portion, and a damping node coupled to the damping node mounting portion. The method further includes positioning the support structure at an impact receiving surface, wherein the damping node is substantially adjacent the impact receiving surface and coupling the support structure to the impact receiving surface via the attachment portion. The damping node is configured to mitigate an impact force received upon the impact receiving surface.

BRIEF DESCRIPTION OF THE SEVERAL VIEWS OF THE DRAWINGS

Illustrative embodiments of the disclosure are described in detail below with reference to the attached drawing figures.

DETAILED DESCRIPTION

Figure 1A:
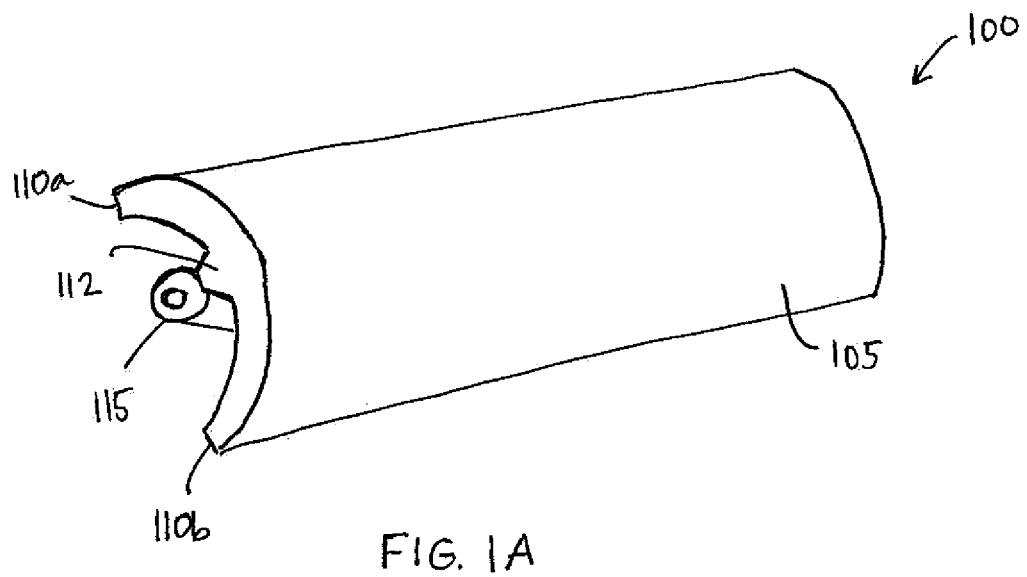
FIG. 1A is a perspective view of a damping system according to an embodiment of the invention.
Figure 2A:
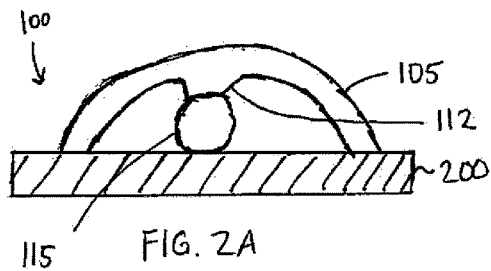
FIGS. 2A through 2H show side views of a damping portion of the damping system of FIG. 1A, according to various embodiments.
Figure 2B:
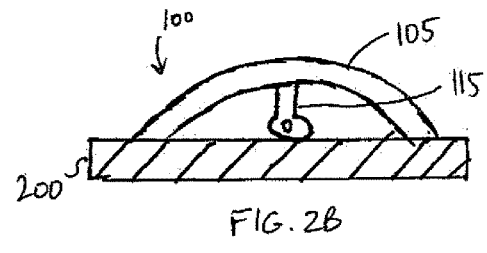
Figure 2C:
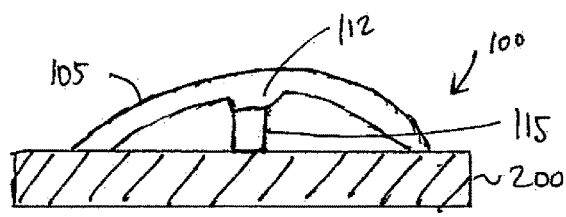
Figure 2D:
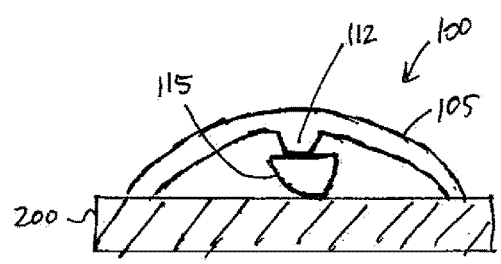
Figure 2E:
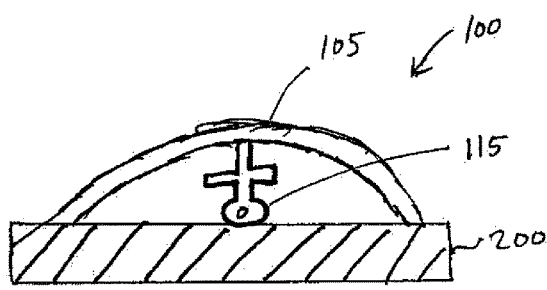
Figure 2F:
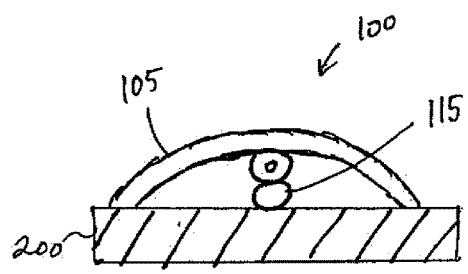
Figure 2G:
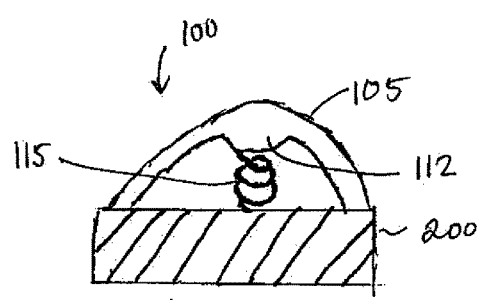
Figure 2H:
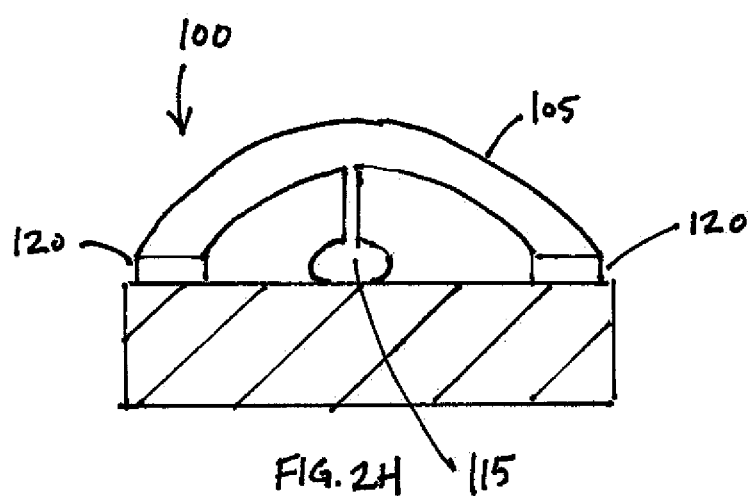
Figure 3:
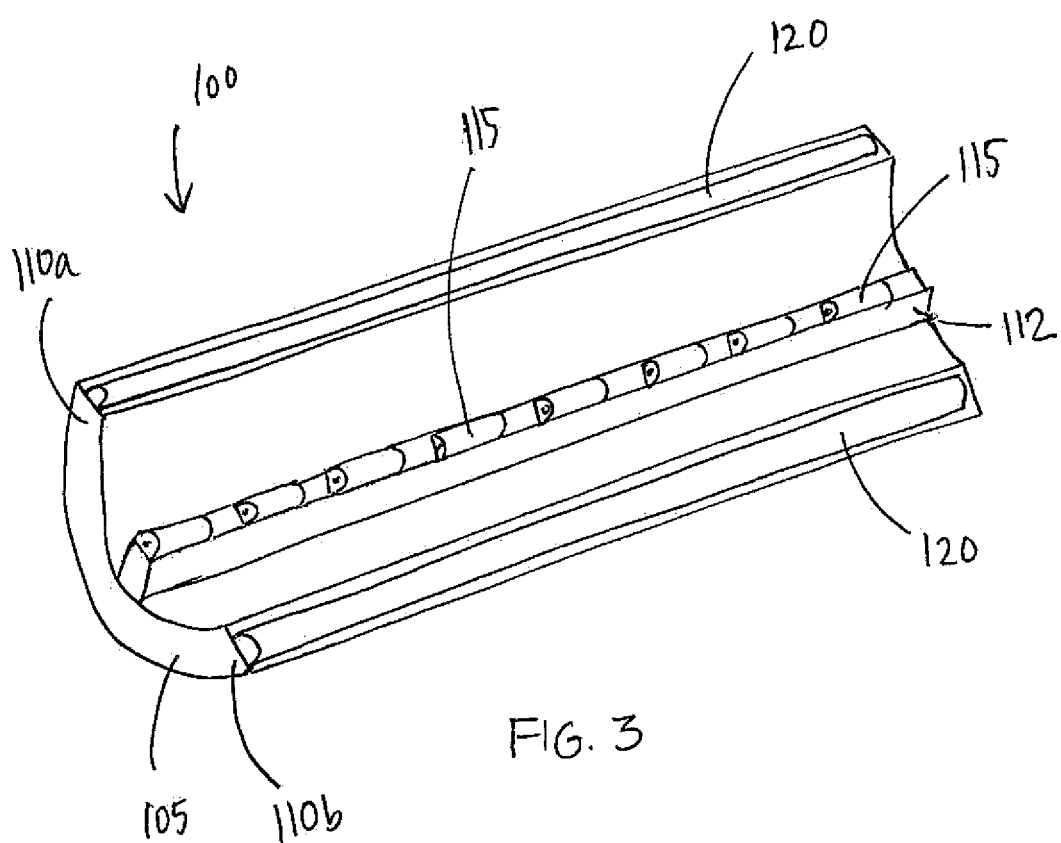
FIG. 3 is a perspective view of an attachment portion of the damping system of FIG. 1A.

FIGS. 1-3 illustrate various embodiments of a damping system 100. The damping system 100 may include a support structure 105, one or more attachment portions 110a, 110b, and a damping portion 115. In operation, the vibration damping system 100 may be configured to attach to a surface 200 (e.g., a window, a wall, a door, etc.) for dampening the vibrations (e.g., vibrations caused by motion, sound, energy, or any other impact force) passing therethrough.

Figure 1B:
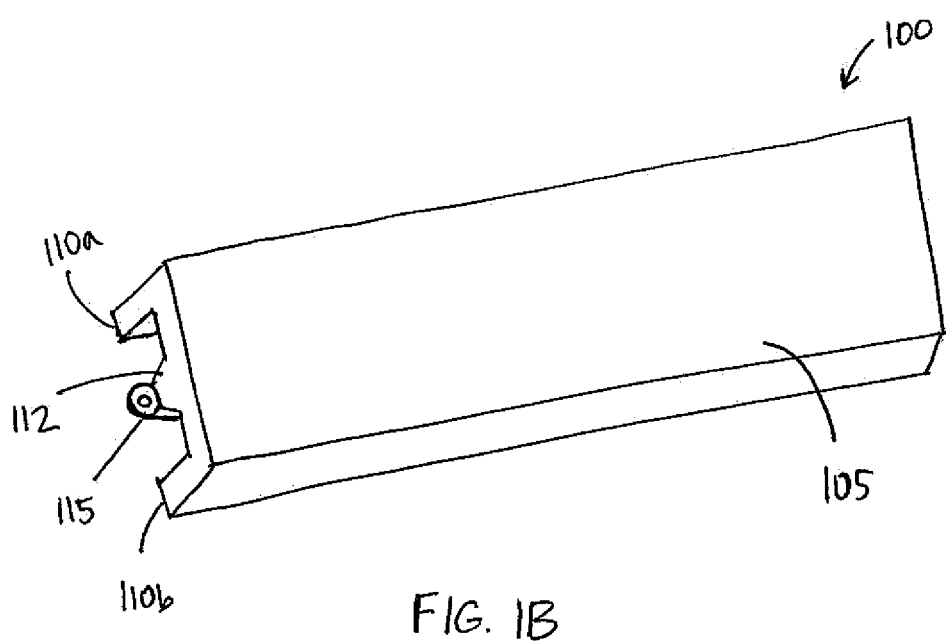
FIG. 1B is a perspective view of the damping system, according to another embodiment.

The support structure 105 is generally a shell for maintaining the components of the damping system 100. In embodiments, the support structure 105 is at least partially hollow. The support structure 105 may be extruded and configured as an open-sided member having a semi-circular profile such as the system 100 shown in FIG. 1A. However, such a shape is not required. As another example, the support structure 105 may be an open-sided member with a rectangular profile such as illustrated in FIG. 1B. Other shapes may also be utilized, including shapes that are not open-sided. For example, embodiments of the support structure 105 may instead have a hollow tube shape (e.g., a rectangular tube, a circular tube, et cetera). In use, the support structure 105 may be an elongated piece that is configured to bring the damping portion 115 of the damping system 100 into contact with a desired surface.

In embodiments, the support structure 105 has a damping node mounting member 112 extending inwardly from an interior of the support structure 105. The damping node 115 may be coupled to the mounting member 112 using any appropriate attaching means. In embodiments, the damping node 115 is co-extruded, co-molded, over-molded, or otherwise manufactured substantially simultaneously with the support structure 105. In other embodiments, the damping node 115 is coupled to the mounting member 112 after the support structure 105 and the damping node 115 are respectively formed. In such a case, the damping node 115 may include, for example, an opening may be formed along the length of the damping node 115 and may be configured to engage with corresponding structure on the mounting member 112. The damping node 115 may thus be coupled to the mounting member 112 by sliding the damping node 115 onto the corresponding structure on the mounting member 112 until the damping node is in place. In further embodiments, the damping node 115 may be adhered to the mounting member 112 using an adhesive.

The damping node 115 is configured to receive and mitigate vibrations that occur on a surface. As such, the damping node 115 may be constructed of a material having damping properties, such as rubber, silicone, plastic, foam, polyurethane, Polyvinyl Chloride (PVC), metal, et cetera. Alternately or additionally, the damping node 115 may be configured to absorb and/or disperse impact forces. Various configurations of damping nodes 115 are illustrated in FIGS. 2A-2G. In FIG. 2A, the damping node 115 is shown as a sphere attached to the mounting member 112 of a support structure 105. In FIG. 2B, the damping node 115 comprises a stem with a hollow circle shape at an end extending away from the support structure 105. Here, as in other embodiments, the damping node 115 may be directly attached to an inside surface of the support structure 105, and the support structure 105 may be devoid of a mounting member 112. FIGS. 2C, 2D, 2E, and 2F illustrate still further non-limiting embodiments of damping nodes 115.

In another example, shown in FIG. 2G, the damping node 115 is a biasing member extending from the support structure 105. The biasing member 115 in the embodiment of FIG. 2G is a helical spring. However, other types of resilient members may alternately (or additionally) be used in different embodiments, such as a flat spring, a gas spring, a hydraulic spring, or a magnetic spring. In embodiments (e.g., in the case of a magnetic spring), a housing may be required to maintain the biasing member 115 in position relative to the support structure 105.

In embodiments, such as illustrated in FIG. 2H, the damping node 115 and the support structure 105 are a singular construction. In other words, the damping node 115 and the support structure 105 may be manufactured together as one piece, and may be manufactured of the same material. Similarity to the embodiments described above, attachment devices 120 may be operable to secure the damping system 100 to the surface 200.

While FIGS. 2A through 2H depict the damping node 115 contacting the surface 200 in the absence of vibrations due to impact forces, it is contemplated herein that the damping node 115 may be arranged such that contact is only made between the surface 200 and the damping node 115 once the surface experiences an impact force. In embodiments, the damping system 100 may be configured to dampen only a particular range of vibrations, such as vibrations that may be harmful to the surface experiencing the vibrations. In other embodiments, the damping system 100 may be configured to dampen any vibration caused by an impact force received by the surface 200.

In embodiments, the damping node 115 may include a plurality of damping nodes 115, such as is illustrated in FIG. 3. For example, the damping node 115 may include a series of damping nodes 115 arranged (e.g., in a row) along an interior length of the support structure 112. The plurality of damping nodes 115 may be arranged in a pattern (e.g., staggered, checkered, randomized, etc.) along the interior of the support structure 112. In other embodiments, the damping node 115 is configured as a strip (e.g., the damping node 115 may have a length that is generally equal to that of the support structure 112).

Attachment components 120, as seen in FIG. 3, may be located at one or more ends 110a, 110b of the support structure 105. The attachment components 120 may include one or more attachment devices, such as tape (e.g., foam tape), adhesives (e.g., pressure sensitive, remoistenable, resealable, etc.), clips, suction cups, et cetera. In embodiments, the attachment devices 120 may include one or more apertures configured to receive bolts, nails, screws, or other fastening mechanism. The respective ends 110a, 110b may have a tab extending outwardly to receive the fastening mechanism In use, the one or more attachment components 120 may allow the support structure 105 to be selectively secured, either permanently or temporarily, to the desired surface. The attachment components 120 may cover the length of the ends 110a, 110b, or may be provided as one or more attachment components 120 selectively disposed on the respective ends 110a, 110b.

In embodiments, the support structure 105 may be configured to have the aesthetic appearance of a conventional surface adornment (e.g., a window muntin). In other embodiments, the support structure 105 may include a shell configured to modify the appearance of the support structure 105, such as a replaceable overlay or "skin" for the support structure 105.

The support structure 105 may be constructed of any suitable material, such as plastic or metal, and may be manufactured by any suitable construction process (e.g., over molding, extrusion, co-extrusion, injection molding, casting, sintering, et cetera). While the support structure 105 shown in the figures has a generally uniform shape, the artisan understands that the support structure 105 may have a non-uniform shape, and that such other support structure 105 shapes are within the scope of the disclosure.

Figure 4:
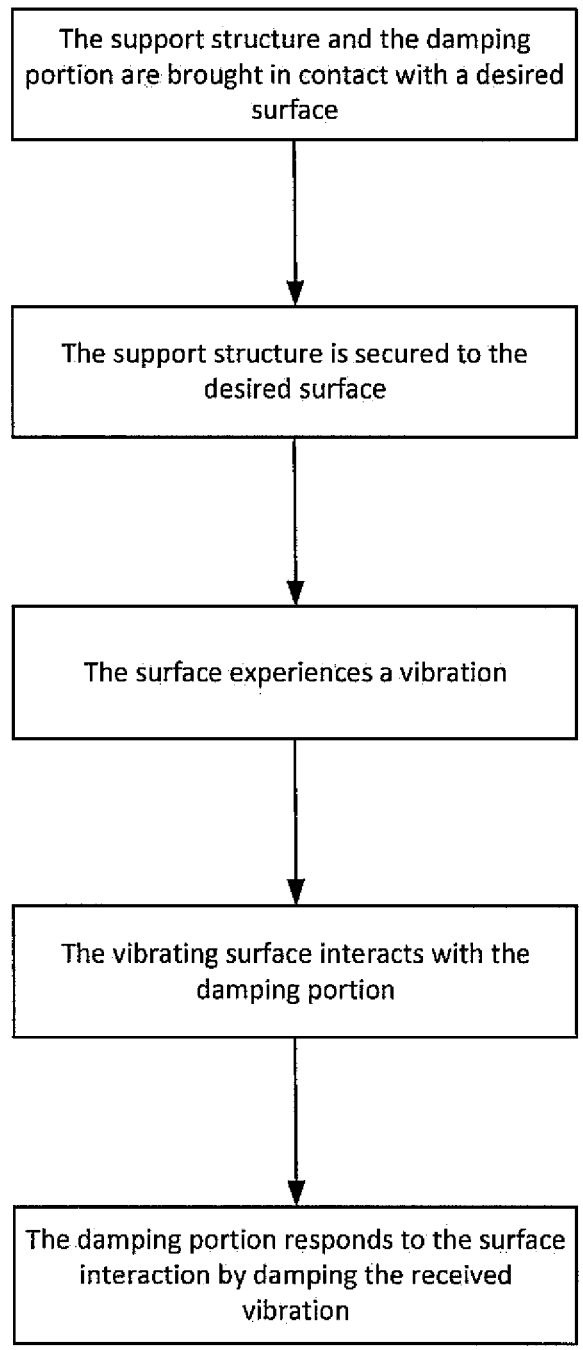
FIG. 4 is a flow chart illustrating a method of operating the damping system of FIG. 1A.

FIG. 4 illustrates a method of operating the damping system 100 described herein. First, the support structure 105 (and specifically the ends 110a, 110b) and/or the damping node 115 may be brought into contact with a desired surface 200. Once the support structure 105 is in the desired location, the support structure 105 may be secured to the surface 200 via the attachment component 120. When the surface 200 experiences a vibration due to an impact force, the surface 200 may interact with the damping node 115 of the damping system 100. In response, the damping node 115 may dampen the vibrations on the surface 200, such as by transferring, dispelling, and/or absorbing the vibration energy. More specifically, the impact force received by the surface 200 may cause the damping node 115 to be temporarily deformed, after which the damping node 115 returns to its pre-deformed state. The temporary deformation of the damping node 115 allows the vibrations due to the impact force to be minimized, or even reduced completely.

Importantly, it shall be understood that the deformation of the damping node 115 may not be noticeable to the naked eye. In other words, some impact forces, e.g., sound waves, may cause vibrations to the surface 200 that cause the damping node 115 to compress and/or expand (e.g., in a pattern based on the vibrations) so minutely that the movements are unrecognizable. However, the slight movement of the damping node 115 may be sufficient so as to limit the transfer of the vibrations through the surface 200. Other impact forces, however, may be significant, and may cause more significant movement of the damping node 115. For example, a rock hitting a window may cause visible compression of the damping node 115. Once the damping node 115 has been temporarily deformed as a result of the impact force, the damping node 115 returns to its initial state. However, due to the damping node 115 receiving some of the impact force from the surface 200, the impact force may be reduced such that the surface 200 remains unharmed.

The artisan will understand that the steps of the method may be modified, added to, and/or omitted as desired, and that such considerations have been contemplated and are within the scope of the present disclosure.

The artisan will understand that the vibration damping systems and methods disclosed herein may include or have associated therewith electronics. The electronics may, for example, include one or more computers having a processor, a memory, a network interface, et cetera. The electronics may be used to control and modify the operation of the damping system (e.g., may be used to detect the surface vibrations, may be used to control the movement of the damping portion, et cetera). In some example embodiments, the processor or processors may be configured through particularly configured hardware, such as an application specific integrated circuit (ASIC), field-programmable gate array (FPGA), etc., and/or through execution of software to allow the vibration damping system to function in accordance with the disclosure herein.

In embodiments, the system 100 includes a sensor configured to sense environmental changes at or around the impact receiving surface 200. The sensor may send information, e.g., over a network, for monitoring. The sensor may optionally be operatively coupled to an indicator or actuator for providing a response to the sensed changed in the environment of the impact receiving surface 200. The indicator may be, for example, a light or other device that is turned on or off based on information from the sensor. In some embodiments, the indicator may cause movements in the damping node 115 to offset the vibrations from the impact force. In some embodiments, the sensor may itself be the indicator/actuator. In still other embodiments, the indicator may accompany the system 100 without a sensor. Of course, as will be understood by those of skill in the art, the sensor may be configured to receive a signal (e.g., from a remote control) for actuating the indicator.

In embodiments, the system 100 may further include a battery for storing energy harvested from the system 100. The energy harvested from the system 100 may be utilized later, e.g., for powering the indicator.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The invention claimed is:

1. A damping system, comprising:
   a support structure comprising an attachment portion and a damping node mounting portion; and
   a damping node integrally formed with the damping node mounting portion, the damping node consisting of a resilient member;
   wherein:
      the support structure is secured to an impact receiving surface via the attachment portion;
      the damping node rests directly on the impact receiving surface; and
      the damping node is configured to mitigate an impact force received upon the impact receiving surface.

2. The damping system of claim 1, wherein the damping node is a sphere.

3. The damping system of claim 2, wherein the sphere is hollow.

4. The damping system of claim 2, wherein the damping node further comprises a stem extending from the sphere.

5. The damping system of claim 4, wherein the damping node further comprises at least one arm extending outwardly from the stem.

6. The damping system of claim 1, wherein the support structure, the damping node mounting portion and the damping node comprise a single piece of material.

7. The damping system of claim 6, wherein the damping node is a sphere.

8. The damping system of claim 1, wherein the damping node is a spring.

9. The damping system of claim 1, wherein the damping node comprises a material selected from the list consisting of: rubber, silicone, plastic, foam, and polyurethane.

10. The damping system of claim 1, wherein the attachment portion comprises an adhesive.

11. The damping system of claim 1, wherein the damping node comprises a plurality of damping nodes.

12. The damping system of claim 11, wherein the plurality of damping nodes is disposed along a length of the damping node mounting portion.

13. The damping system of claim 1, wherein the damping node extends substantially along a length of the damping node mounting portion.

14. The damping system of claim 1, wherein the attachment portion is configured to receive a fastening mechanism for securing the support structure to the impact receiving surface.

15. The damping system of claim 1, further comprising a sensor, the sensor being configured to send and receive signals.

16. The damping system of claim 15, wherein the signals are based on the impact force received upon the impact receiving surface.

17. A method for damping impact forces, comprising:
   providing a damping device comprising:
      a support structure comprising an attachment portion, and a damping node coupled to the support structure, wherein the damping node is co-extruded, co-molded, or over-molded with the support structure;
   positioning the support structure at an impact receiving surface, wherein the damping node is directly on the impact receiving surface; and
   coupling the support structure to the impact receiving surface via the attachment portion;
   wherein;
      the damping node consists of a resilient member; and
      the damping node is configured to mitigate an impact force received upon the impact receiving surface.

18. The method of claim 17, wherein the damping node comprises a material selected from the list consisting of: rubber, silicone, plastic, foam, and polyurethane.

19. The method of claim 17, wherein the support structure is configured as a hollow tube.

20. A damping system, comprising:
   a support structure comprising an attachment portion and a damping node mounting portion; and
   a damping node attached to the damping node mounting portion;
   wherein:
      the support structure is secured to an impact receiving surface via the attachment portion;
      the damping node comprises a sphere, a stem extending from the sphere, and at least one arm extending outwardly from the stem; and
      the damping node is configured to mitigate an impact force received upon the impact receiving surface.

* * * * *